United States Patent
Madukkarumukumana et al.

(10) Patent No.: US 7,103,683 B2
(45) Date of Patent: Sep. 5, 2006

(54) METHOD, APPARATUS, SYSTEM, AND ARTICLE OF MANUFACTURE FOR PROCESSING CONTROL DATA BY AN OFFLOAD ADAPTER

(75) Inventors: Rajesh S. Madukkarumukumana, Portland, OR (US); Jie Ni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 10/695,006

(22) Filed: Oct. 27, 2003

(65) Prior Publication Data

US 2005/0091406 A1 Apr. 28, 2005

(51) Int. Cl.
- *G06F 13/12* (2006.01)
- *G06F 13/10* (2006.01)
- *G06F 13/00* (2006.01)
- *G06F 12/00* (2006.01)

(52) U.S. Cl. .............. 710/52; 710/8; 710/11; 710/54; 710/64; 709/228; 709/235; 711/100; 711/147

(58) Field of Classification Search ............ 710/8, 710/11, 52, 54, 64; 709/228, 235; 711/147, 711/100

See application file for complete search history.

(56) References Cited

U.S. PATENT DOCUMENTS

| | | | | |
|---|---|---|---|---|
| 4,707,827 A | * | 11/1987 | Bione et al. | 370/405 |
| 4,941,089 A | * | 7/1990 | Fischer | 709/231 |
| 5,058,110 A | * | 10/1991 | Beach et al. | 370/464 |
| 5,073,852 A | * | 12/1991 | Siegel et al. | 719/313 |
| 5,430,842 A | * | 7/1995 | Thompson et al. | 709/236 |
| 6,081,883 A | * | 6/2000 | Popelka et al. | 712/28 |
| 6,282,626 B1 | * | 8/2001 | Platko et al. | 711/209 |
| 2003/0079033 A1 | | 4/2003 | Craft et al. | |

FOREIGN PATENT DOCUMENTS

WO WO02/27519 4/2002

OTHER PUBLICATIONS

Information Sciences Institute, "Internet Protocol", *DARPA Internet Program Protocol Specification*, [online], RFC 791, Sep. 1981, pp. 1-44, [Retrieved on Mar. 24, 2004]. Retrieved from the Internet at <URL: http://www.faqs.org/rfcs/rfc791.html>.

Information Sciences Institute, "Transmission Control Protocol", *DARPA Internet Program Protocol Specification*, [online], RFC 793, Sep. 1981, pp. 1-84, [Retrieved on Mar. 24, 2004]. Retrieved from the Internet at <http://www.faqs.org/rfcs/rfc793.html>.

(Continued)

*Primary Examiner*—Fritz Fleming
*Assistant Examiner*—Scott Sun
(74) *Attorney, Agent, or Firm*—Rabindranath Dutta; Konrad Raynes & Victor LLP

(57) ABSTRACT

Provided are a method, system, and article of manufacture, where in one embodiment of the method metadata related to a packet may be allocated in a host memory by a protocol processor, where the host memory may be comprised in a host that may be capable of being coupled to a network adapter. The metadata may be copied from the host memory to an adapter memory that may be associated with the network adapter. The copied metadata may be processed by the protocol processor.

22 Claims, 7 Drawing Sheets

OTHER PUBLICATIONS

McLean, P. T., (Tech. Ed.), "Information Technology- AT Attachment-3 Interface (ATA-3)", X3T10, 2008D, Revision 5, Oct. 6, 1995.

Monia, C. (Tech. Ed.), "Information Technology- SCSI-3 Architecture Model", X3T10, 994D, Revision 18, Nov. 27, 1995.

U.S. Appl. No. 10/448,797, filed May 30, 2003, entitled "Method, System and Article of Manufacture for Network Protocols", invented by A.R. Davis, R. S. Madukkarumukumana, & S.C. Smith.

U.S. Appl. No. 10/637,370, filed Aug. 7, 2003, entitled "Method, System, and Article of Manufacture for Utilizing Host Memory From an Offload Adapter", invented by R. S. Madukkarumukumana, & J. Ni.

Yeh, E., H. Chao, V. Mannem, J. Gervais, and B. Booth, "Introduction to TCP/IP Offload Engine (TOE)", Version 1.0, Apr. 2002.

PCT/US2004/035127 From PCT/ISA/220 International Search Report & Written Opinion mailed Feb. 24, 2005.

* cited by examiner

METHOD, APPARATUS, SYSTEM, AND ARTICLE OF MANUFACTURE FOR PROCESSING CONTROL DATA BY AN OFFLOAD ADAPTER

BACKGROUND

1. Field

The disclosure relates to a method, apparatus, system, and an article of manufacture for processing control data by an offload adapter.

2. Background

A network adapter may be coupled to a host system to provide communications. Some network adapters may provide hardware support for the processing of data related to the Transmission Control Protocol/Internet Protocol (TCP/IP) that may be used for communications. Such network adapters may be referred to as TCP/IP offload engine (TOE) adapters. Further details of the TCP/IP protocol are described in the publication entitled "Transmission Control Protocol: DARPA Internet Program Protocol Specification," prepared for the Defense Advanced Projects Research Agency (RFC 793, published September 1981).

TOE adapters may perform all or major parts of the TCP/IP protocol processing. including processing send requests, i.e., requests to send packets from a host system to a computational device. High speed data transmission technologies may be used for coupling a host system to a network. As a result a TOE adapter coupled to the host system may have to handle a large number of connections. The flow of packets to and from the host system in such high speed transmission technologies may be high. The TOE adapter may store control data related to a large number of packets and connections, where the control data may include information about the packets and connections. Further details of the TOE adapter in high speed data transmission technologies, such as, Gigabit Ethernet, are described in the publication entitled "Introduction to the TCP/IP Offload Engine" available from the 10 Gigabit Ethernet Alliance (published April, 2002).

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

Certain embodiments comprise a protocol processor, such as, a protocol processing application, in a network adapter coupled to a host system. The protocol processor is capable of processing commands related to a networking protocol or any other protocol. In these embodiments, the protocol processor may reduce memory requirements in the network adapter by utilizing the memory in the host system to store control information related to protocol processing.

Figure 1:
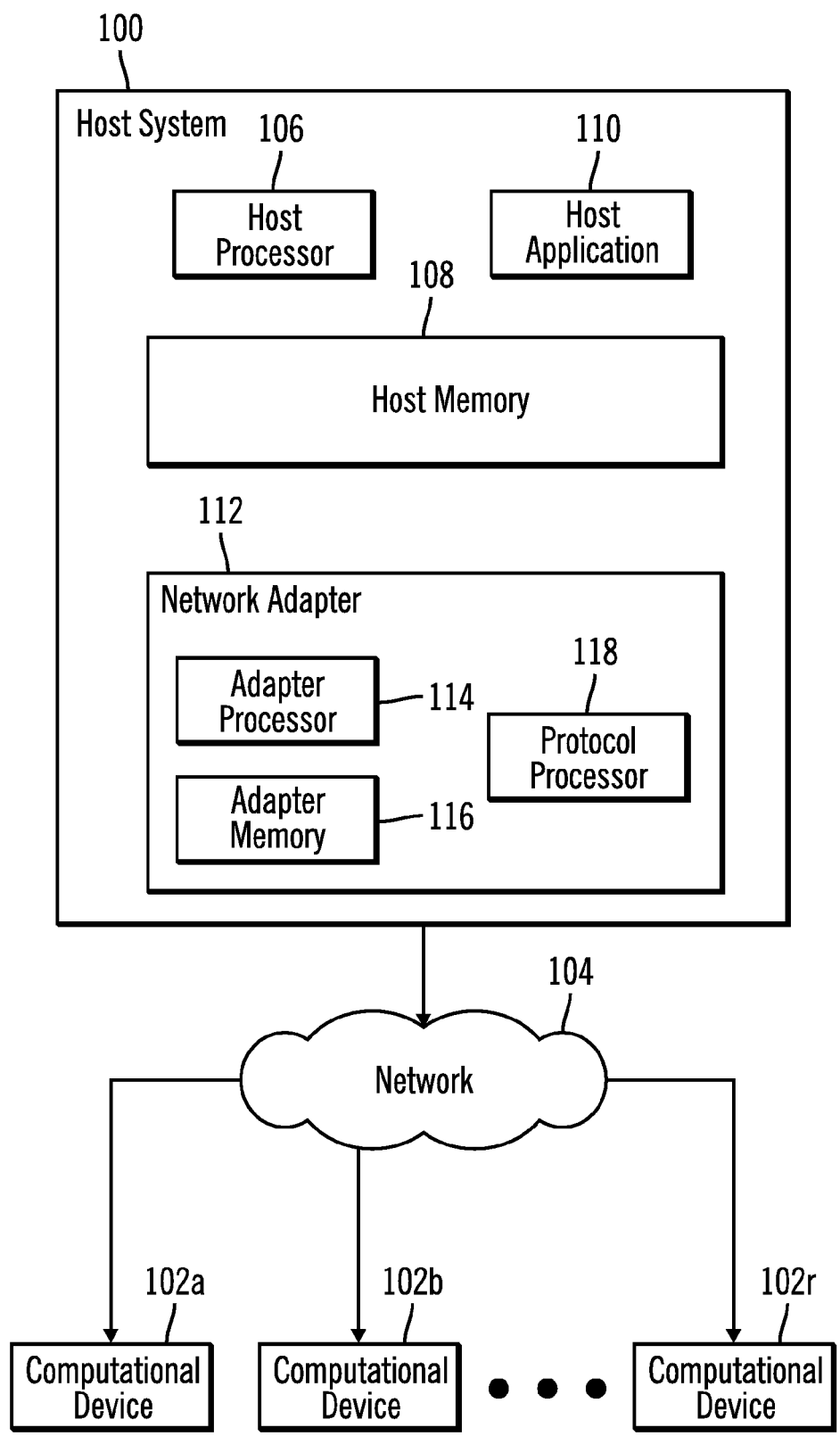
FIG. 1 illustrates a block diagram of a computing environment, in accordance with certain described embodiments of the invention.

FIG. 1 illustrates a block diagram of a computing environment, in accordance with certain embodiments of the invention. A host system 100 may be coupled to a plurality of computational devices 102*a* . . . 102*r* over a network 104. The host system 100 sends and receives packets over the network 104. The packets may be for communication between the host system 100 and one or more of the computational devices 102*a* . . . 102*r*. The host system 100 may be a computational device, such as a personal computer, a workstation, a server, a mainframe, a hand held computer, a palm top computer, a laptop computer, a telephony device, a network computer, etc. The computational devices 102*a* . . . 102*r* may include various types of computers, routers, storage devices, etc. The network 104 may be any network, such as the Internet, an intranet, a Local area network (LAN), a Storage area network (SAN), a Wide area network (WAN), a wireless network, etc. Also the network 104 may be part of one or more larger networks or may be an independent network or may be comprised of multiple interconnected networks. In certain embodiments, the network 104 may be implemented with high speed transmission technologies, such as, Gigabit Ethernet technology.

The host system 100 may comprise at least one host processor 106, a host memory 108, at least one host application 110, and a network adapter 112. Instructions that comprise the host application 110 may be stored in the host memory 108 and executed by the host processor 106. Certain regions of the host memory 108 may be utilized for processing by the network adapter 112. The host application 110 may generate commands related to the TCP/IP protocol for the network adapter 112. For example, the host application 110 may send or receive packets via the network adapter 112.

The network adapter 112 may include a network adapter that includes hardware support for processing at least some commands related to at least one IP protocol, such as, the TCP/IP protocol. For example, the network adapter 112 may include a TCP offload engine adapter or other logic capable of causing communications.

The network adapter 112 includes an adapter processor 114, an adapter memory 116, and a protocol processor 118 that processes commands related to a communications protocol. The adapter processor 116 may comprise an application specific integrated circuit (ASIC), a reduced instruction set computer (RISC) processor, a complex instruction set computer (CISC) processor, etc. The adapter memory 116 may be any memory known in the art, and in certain embodiments may be referred to as a side random access memory (side RAM). In certain embodiments, the storage capacity of the adapter memory 116 is significantly less that of the host memory 108. The protocol processor 118 may be implemented in hardware and/or software in the network adapter 112. If the protocol processor 118 is implemented at least in part in software, code for the protocol processor 118 may reside in the adapter memory 116 or any other storage on the network adapter 112. In certain embodiments, the protocol processor 118 may be implemented as an ASIC in hardware as part of the network adapter 112. In alternative embodiments, the protocol processor 118 may reside outside the network adapter 112, such as in the host memory 108 of the host system 100. In yet additional embodiments, the network adapter 112 including the protocol processor 118 may be implemented in the host processor 106.

The protocol processor 118 utilizes the host memory 108 for storing control information related to protocol processing, thereby reducing and/or minimizing memory requirements of the adapter memory 118. Protocol processing may include the processing of instructions related to a protocol. The control information is metadata related to the packets sent and received by the network adapter 112. Such metadata may include protocol control blocks of the TCP/IP protocol. Other networking protocols may have other types of metadata. Since the adapter memory 116 may be significantly smaller in storage capacity than the host memory 108, packets may sometimes be processed at a faster rate when the host memory 108 is utilized by the protocol processor 118. Furthermore, since the memory requirements of the adapter memory 116 are reduced, the cost of the network adapter 112 may be reduced.

FIG. 1 illustrates how in certain embodiments the protocol processor 118 in the network adapter 112 utilizes the host memory 108 for processing control data related to TCP/IP protocol processing.

Figure 2:
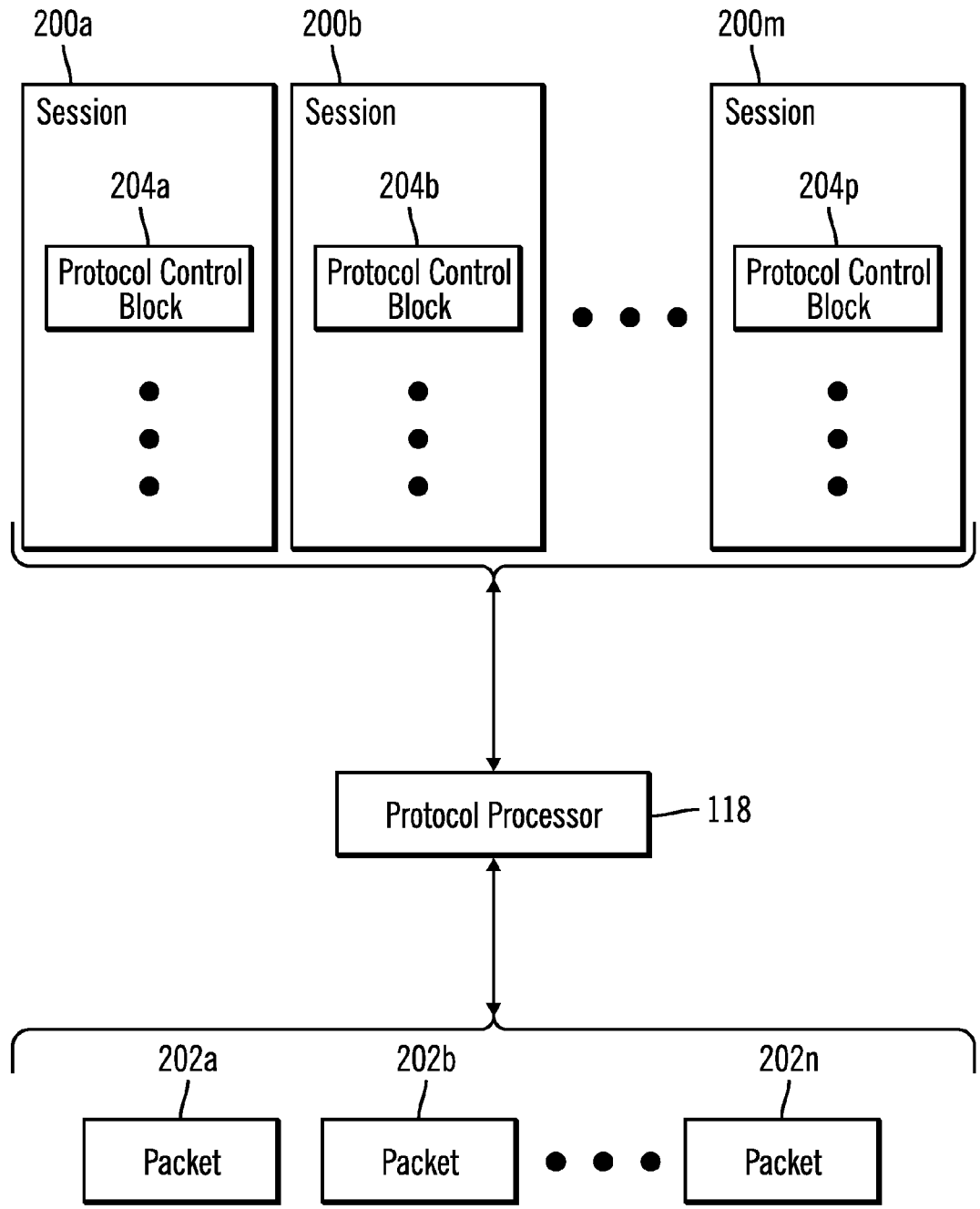
FIG. 2 illustrates a block diagram of data structures implemented in the computing environment, in accordance with certain described embodiments of the invention.

FIG. 2 illustrates a block diagram representing data structures that may be implemented in the host system 100, in accordance with certain embodiments of the invention. Data structures implemented in the host system 100 include data structures representing a plurality of sessions 200*a* . . . 200*m*, a plurality of packets 202*a* . . . 202*n*, and a plurality of protocol control blocks 204*a* . . . 204*p*. In certain embodiments the data structures may be implemented in the host memory 108 or the adapter memory 116 of the host system 100, and a session may include one or more related data exchanges established between the host system 100 and a computational device 102*a* . . . 102*r*. In certain embodiments the data exchanges included in a session may be unrelated and sessions may be formed in any protocol layer.

The sessions 200*a* . . . 200*m* may represent TCP/IP sessions, where a TCP/IP session may include a set of data exchanges established between the host system 100 and a computational device 102*a* . . . 102*r*. A session has at least one protocol control block. For example, session 200*a* includes the protocol control block 204*a*. A protocol control block stores information representing the state of a session. For example, the protocol control block 204*a* may store information representing the state of the session 200*a*. A protocol control block 204*a* . . . 204*p* may include the number of packets received in a particular session, the number of packets sent in a particular session, timing data related to a particular session, etc.

The packets 202*a* . . . 202*n* may represent TCP/IP packets for communication between the host system 100 and a computational device 102*a* . . . 102*r*. The packets 202*a* . . . 202*n* may be received by the network adapter 112 or transmitted by the network adapter 112. The protocol processor 118 processes the packets 202*a* . . . 202*n* and updates the protocol control blocks 204*a* . . . 204*p* corresponding to the session 200*a* . . . 200*n* to which a packet belongs.

FIG. 2 illustrates how the protocol processor 118 processes packets 202*a* . . . 200*n* and updates the corresponding protocol control blocks 204*a* . . . 204*p*.

Figure 3:
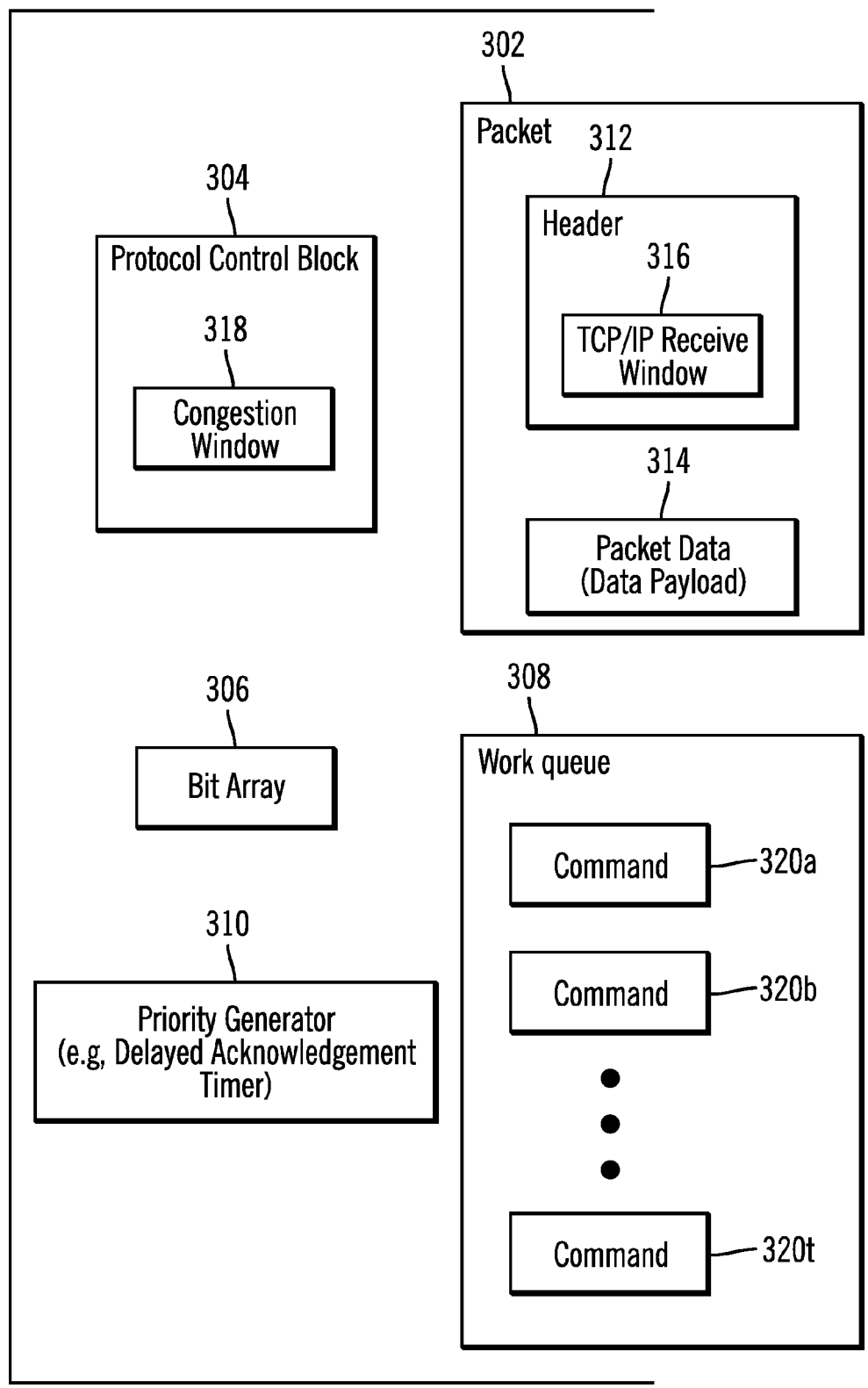
FIG. 3 illustrates a block diagram of data structures implemented in the computing environment, in accordance with certain described embodiments of the invention.

FIG. 3 illustrates a block diagram representing data structures implemented in the host system 100, in accordance with certain embodiments of the invention. Data structures implemented in the host system 100 may include data structures representing a packet 302, a protocol control block 304, a bit array 306, a work queue 308, and a priority generator 310. In certain embodiments, the data structures may be implemented in the host memory 108 or the adapter memory 116 of the host system 100.

The packet 302 is a representative data structure corresponding to the packets 202*a* . . . 202*n*. The packet 302 may include a header 312 and packet data 314 where the packet data 314 is a data payload. The header 312 may include a TCP/IP receive window 316, where the TCP/IP receive window 316 may include information related to the amount of resources available for receiving TCP/IP packets at a remote system, such as, a computational device 102*a* . . . 102*r*, that is in communication with the host system 100.

The protocol control block 304 is a representative data structure corresponding to the protocol control blocks 204*a* . . . 204*p*. The protocol control block 304 stores information reflecting the state of a session established between the host system 100 and a computational device 102*a* . . . 102*r*. For example, the protocol control block 304 may include a congestion window 318, where the congestion window 318 may include information on the extent of congestion in the network 104 that has an effect on packet based communications between the host system 100 and the computational devices 102*a* . . . 102*r*.

The protocol processor 118 is capable of updating the protocol control block 304 based on information included in the header 312 of a packet 302 that has been received via the network adapter 112. Additionally, the protocol processor 118 is capable of updating the header 312 of a packet being sent via the network adapter 112, where the information to update the header 312 may be extracted from the protocol control block 304.

The bit array 306 is a data structure stored in the adapter memory 116 of the network adapter 112 which indicates the sessions 200*a* . . . 200*m* that are capable of processing send requests, i.e., requests to send packets from the host system 100 to a computational device 102*a* . . . 102*r*. In certain embodiments, the bit array 306 may have a plurality of bits with a bit representing a session. For example in certain embodiments, each bit may represent a different session. If at a point in time a bit representing a session is one then the session is capable of processing send requests at that point in time, and if the bit is zero then the session is incapable of processing send requests at that point in time. For example, if the congestion window 318 of a protocol control block 304 corresponding to a session indicates that there is too much congestion in the network 104 to send a packet in a session, then in the bit array 306 the bit representing the session may be zero. Additionally, information from the TCP/IP receive window 316 extracted and stored in the protocol control block 304 may also indicate that a certain session is incapable of processing send requests from the host system 100 because of inadequate resources at the receiver, such as a computational device 102*a* . . . 102*r*. Other data structures besides a bit array 306 may be used to indicate the capability of a session 200*a* . . . 200*m* to process send requests.

The work queue 308 is a data structure stored in adapter memory 116 that includes commands 320*a* . . . 320*t* that are awaiting to be processed at the network adapter 112. The protocol processor 118 may generate commands to process packets 202a . . . 202n. Not all commands generated by the protocol processor may be executed by the network adapter 112 simultaneously. The protocol processor 118 delays the execution of certain commands by placing the commands in the work queue 308.

The priority generator 310 may indicate a list of commands that have to be executed with a high priority. In certain embodiments, the priority generator may be a delayed acknowledgment timer, where the expiry of the delayed acknowledgment timer indicates that certain sessions have to be executed immediately. The delayed acknowledgment timer acknowledges packets received at the network adapter 112 via a transport protocol, such as the TCP/IP protocol. The protocol processor 118 may select commands from the work queue 308 for priority processing based on information generated by the priority generator 310.

FIG. 3 illustrates how a bit array 306 stores information on the sessions that are capable of processing send requests. FIG. 3 also illustrates how a priority generator 310 can prioritize certain commands over other commands.

Figure 4:
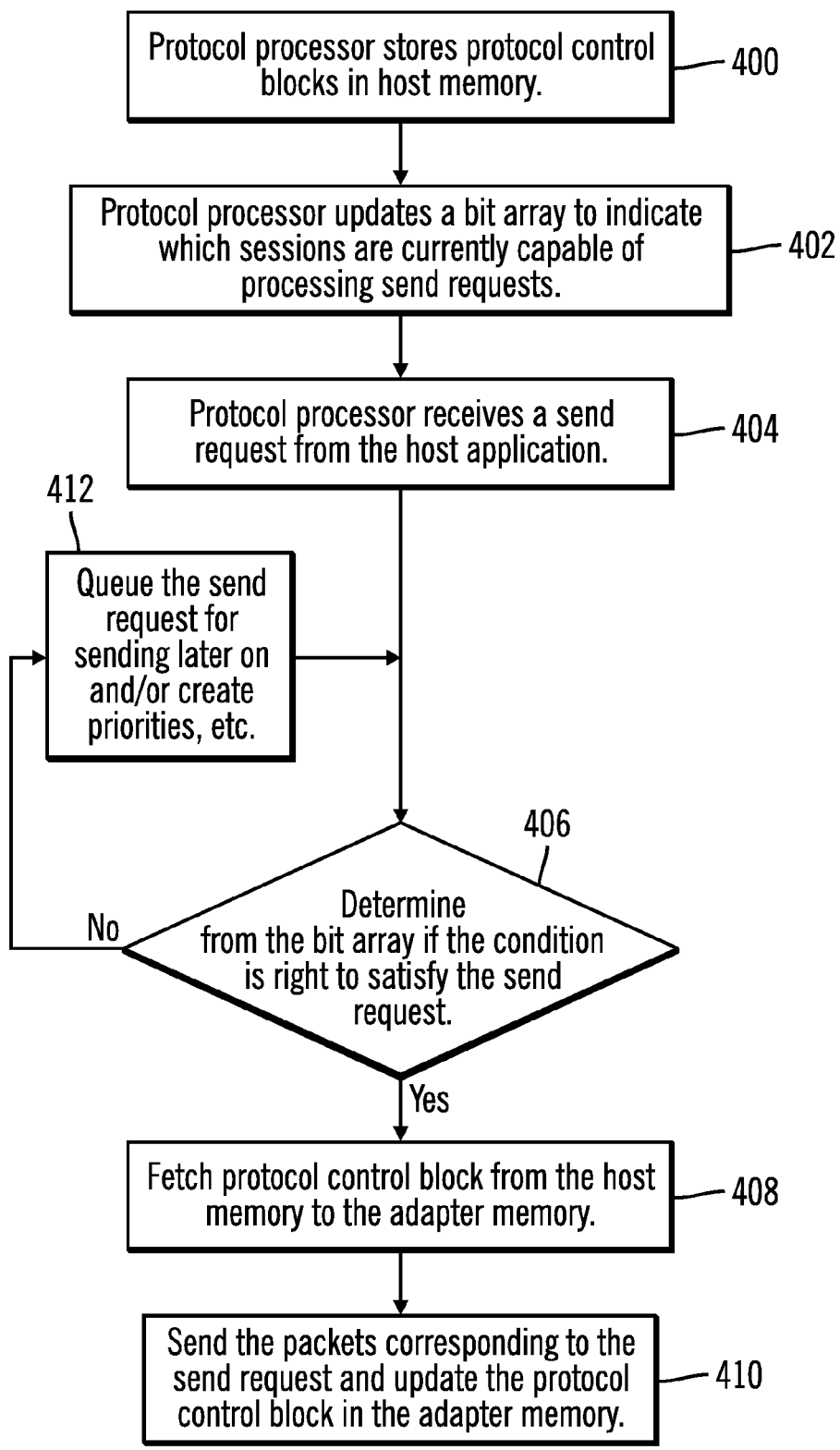
FIG. 4 illustrates operations, in accordance with certain described embodiments of the invention.

FIG. 4 illustrates operations implemented by the protocol processor 118, in accordance with certain embodiments of the invention.

Control starts at block 400, where the protocol processor 118 in the course of TCP/IP protocol processing stores protocol control blocks 204a . . . 204p in the host memory 108. The host memory 108 is greater in size than the adapter memory 116 and a larger number of protocol control blocks can be stored if the protocol control blocks are stored in the host memory.

During the course of protocol processing, the protocol processor 118 periodically updates (at block 402) the bit array 306 to indicate which of the sessions 200a . . . 200m are capable of processing send requests. The updates may be based on values stored in the congestion window 318 or information extracted from the TCP/IP receive window 316 but could be based on any other information.

The protocol processor 118 receives (at block 404) a send request from the host application 110. The send request from the host application 110 may be a request to send a plurality of packets corresponding to a particular session from the host system 100 to a computation device 101a . . . 102r over the network 104. In alternative embodiments, the send request may be generated by the protocol processor 118 in order to send an acknowledgment of received packets. The send request is associated with a session.

The protocol processor 118 determines (at block 406) from the bit array 306 if the particular session corresponding to the send request is capable of processing the send request. The bit array 306 includes information on whether a session is capable of processing a send request. For example, based on the value of the congestion window 318 of the protocol control block 304 of a session, the corresponding bit in the bit array 306 of the session may have been set to zero or one at an earlier point in time. If the protocol processor 118 determines (at block 406) that the particular session is capable of processing the send request then the protocol processor 118 fetches (at block 408) the protocol control block corresponding to the session from the host memory 108 to the adapter memory 116. The protocol processor 118 takes less time to access the protocol control block from the adapter memory 116 when compared to accessing the protocol control block from the host memory 108. Since packets have to be sent, the protocol control block corresponding to the session of the packets may have to be accessed or updated. Therefore, the protocol processor 118 fetches the protocol control block from the host memory 108 to the adapter memory 116 before sending the packets. Since the bit array is an array of bits, the bit array takes only a small amount of memory in the adapter memory 116.

The protocol processor 118 sends (at block 410) the packets corresponding to the send request and updates the protocol control block in the adapter memory 116. If protocol processor 118 determines (at block 406) that the particular session is incapable of processing the send request then the protocol processor 118 queues (at block 412) the send request from sending later on. In certain embodiments, the send request in put in the work queue 308 for processing later on.

FIG. 4 illustrates how the protocol processor 118 stores protocol control blocks in the host memory 108 and on receiving a send request fetches a protocol control block from the host memory 108 to the adapter memory 116 when a session including the protocol control block is capable of processing the send request.

Figure 5:
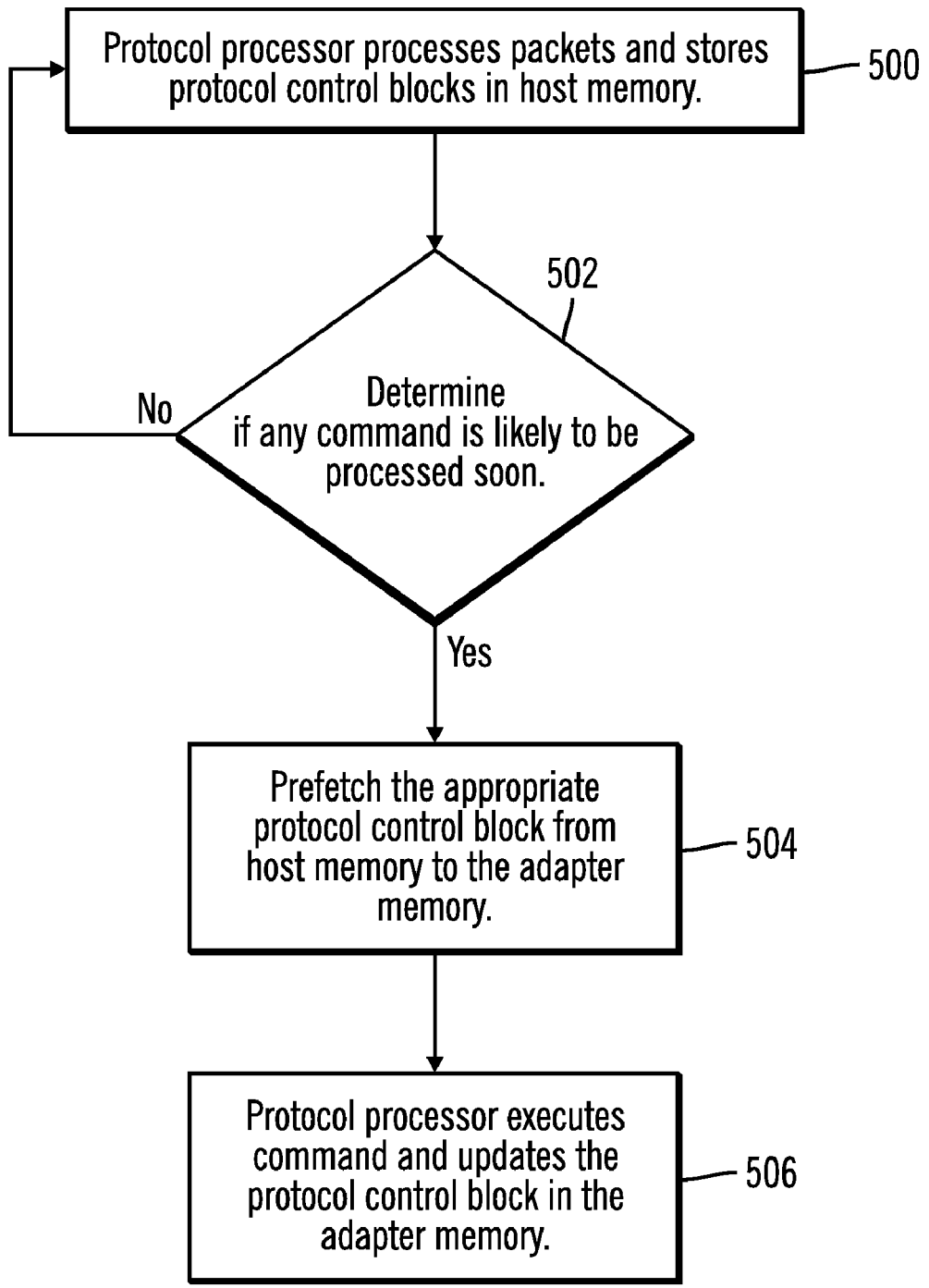
FIG. 5 illustrates operations, in accordance with certain described embodiments of the invention.

FIG. 5 illustrates operations implemented by the protocol processor 118, in accordance with certain embodiments of the invention.

Control starts at block 500, where the protocol processor 118 processes packets 202a . . . 202n to perform protocol processing. During protocol precessing the protocol processor 118 stores protocol control blocks in the host memory 108. The protocol processor 118 determines (at block 502) if any commands are likely to be processed soon. For example, the priority generator 310 may indicate that a delayed acknowledgment timer is nearing expiry and the command 320b may have to be processed soon. Other embodiments may use a different or additional criterion to determine if any command is likely to be processed soon. If the protocol processor 118 determines that a command is likely to be processed soon then the protocol processor 118 prefetches (at block 504) the appropriate protocol control block from the host memory 108 to the adapter memory 116. The protocol processor 118 executes (at block 506) the command from the work queue 308 and updates the protocol control block in the adapter memory 114. In alternative embodiments, the command may reside outside of the work queue 308.

If the protocol processor 118 determines that a command is not likely to be processed soon then the protocol processor 118 returns control to block 500, where the protocol processor 118 processes packets to perform protocol processing.

FIG. 5 illustrates how the protocol processor 118 prefetches those protocol control blocks that are likely to be used soon from the host memory 108 to the adapter memory 116.

Figure 6:
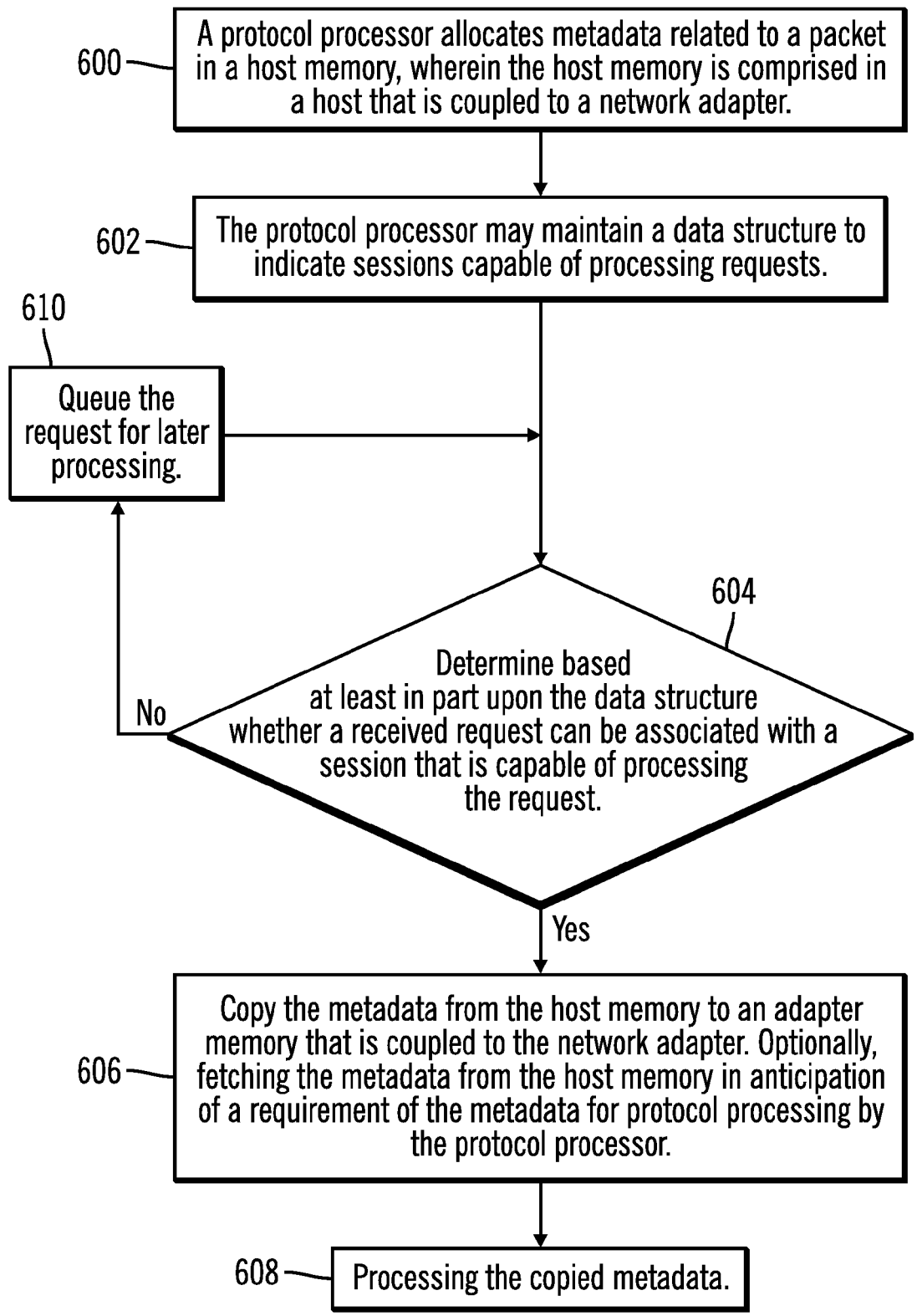
FIG. 6 illustrates operations, in accordance with certain described embodiments of the invention.

FIG. 6 illustrates operations implemented by the protocol processor 118, in accordance with certain embodiments of the invention.

Control starts at block 600 where the protocol processor 118 allocates metadata related to a packet in the host memory 108, where the host memory 108 is coupled to the host 110 that is coupled to the network adapter 112. In certain embodiments, the metadata may comprise the protocol control block 204. The protocol processor 118 may maintain (at block 602) a data structure, such as, the bit array 306, to indicate sessions capable of processing requests. The protocol processor 118 determines (at block 604) based at least in part upon the data structure whether a received request can be associated with a session that is capable of processing the request. If so, the protocol processor 118 copies (at block 606) the metadata from the host memory 108 to the adapter memory 116 that is coupled to the network adapter 112. Optionally, the protocol processor 118 may also have fetched the metadata from the host memory in anticipation of a requirement for protocol processing of the metadata. The protocol processor 118 processes (at block 608) the copied metadata.

If at block 604, the protocol processor 118 determines that the request cannot be associated with any session that is capable of processing the request then the protocol process queues (at block 610) the request for later processing and control returns to block 604.

Certain embodiments comprise a protocol processor 118 implemented in a network adapter 112 coupled to a host system 110. The protocol processor 118 utilizes the host memory 108 in the host system 110 for storing metadata, such as, control data, related to protocol processing for both sending and receiving packets and minimizes memory requirements in the network adapter 112. The metadata may include information related to the control data. Certain embodiments may prefetch the stored metadata from the host memory 108 to the adapter memory 116 in anticipation of the stored metadata being required. As a result, protocol processing may not have to wait for the metadata to be copied from the host memory 108 to the adapter memory 114.

Furthermore, in many embodiments, such as, when a hierarchy of protocols formed by higher level protocols operating over lower level protocols have to be processed by the protocol processor 118, the size of the metadata for a session may so large that storing the metadata of a plurality of sessions may exceed the size of the adapter memory 116. In such a situation, certain embodiments can still perform protocol processing by storing the metadata of the plurality of session in the host memory 108.

Additionally, in these embodiments by maintaining information on the sessions that are ready to process packets in the adapter memory 116, the protocol processor 118 can selectively copy the metadata associated with only those sessions that are ready to process packets.

These embodiments reduce the need for data staging buffers in adapter memory resulting in a smaller adapter memory size and may result in a less expensive network adapter. Some embodiments may be implemented in LAN-on-motherboard, i.e., a LAN enabled motherboard, configurations. Some embodiments are also suited for TOE integration to processor chip sets. Certain embodiments allow the network adapter to process a large number of packets at a rate that is adequate for the flow of packets by offloading control data, such as, protocol control blocks, to the host memory.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art.

Figure 7:
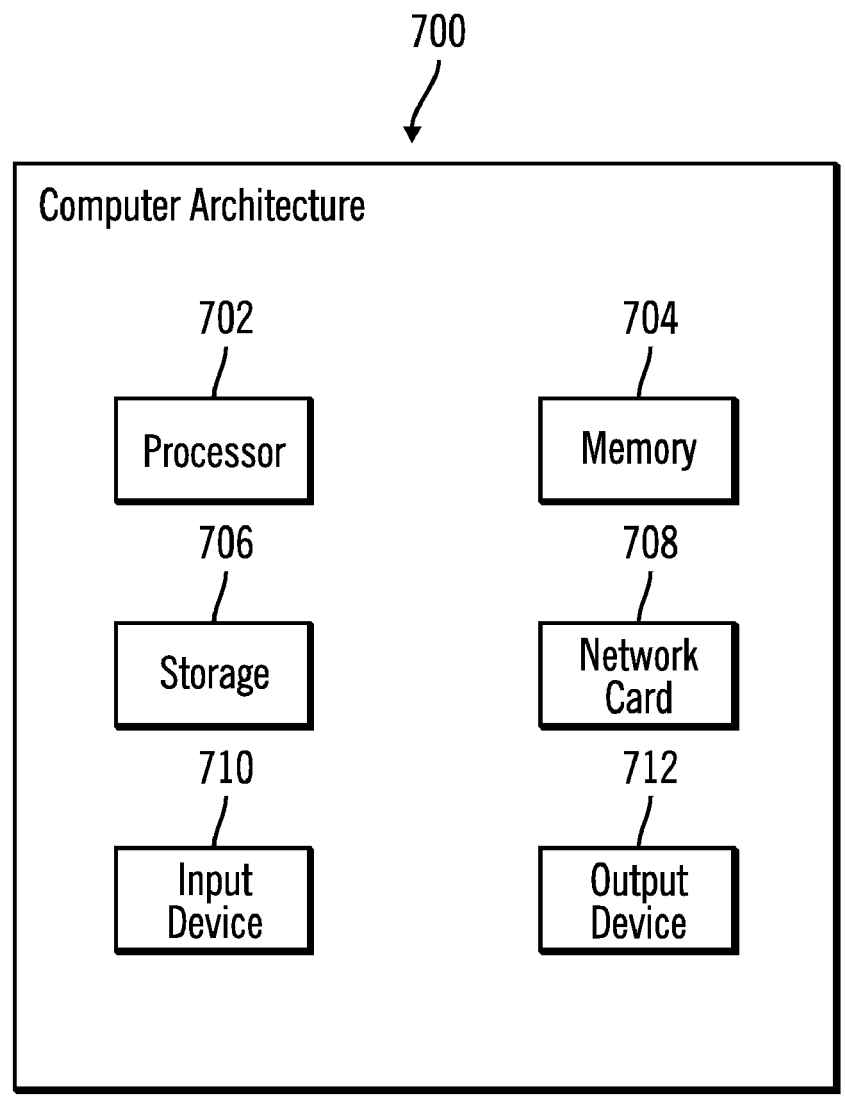
FIG. 7 illustrates a block diagram of a computer architecture in which certain described embodiments of the invention are implemented.

FIG. 7 illustrates a block diagram of a computer architecture in which certain embodiments are implemented. FIG. 7 illustrates one embodiment of the host system 100. The host system 100 may implement a computer architecture 700 having a processor 702 (such as the host processor 106), a memory 704 (e.g., a volatile memory device, such as, the host memory 108), and storage 706. The storage 706 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 706 may comprise an internal storage device, an attached storage device and/or a network accessible storage device. Programs in the storage 706 may be loaded into the memory 704 and executed by the processor 702 in a manner known in the art. The architecture may further include a network card 708 (such as network adapter 112) to enable communication with a network. The architecture may also include at least one input device 710, such as a keyboard, a touchscreen, a pen, voice-activated input, etc., and at least one output device 712, such as a display device, a speaker, a printer, etc.

In certain implementations, network adapter may be included in a computer system including any storage controller, such as a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative implementations, the network adapter embodiments may be included in a system that does not include a storage controller, such as certain hubs and switches. Further details of SCSI are described in the publication entitled "Information Technology: SCSI-3 Architecture Model," prepared by the X3T10 Technical Committee (published November 1995). Further details of ATA are described in the publication entitled "AT Attachment-3 Interface (ATA-3)" prepared by the X3T10 Technical Committee (published October 1995).

Certain embodiments may be implemented in a computer system including a video controller to render information to display on a monitor coupled to the computer system including the network adapter 112, such as a computer system comprising a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the network adapter may be included in a card coupled to a computer system or on a motherboard of a computer system.

At least certain of the operations of FIGS. 4, 5, and 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into fewer number of components or divided into larger number of components. Additionally, certain operations described as performed by a specific component may be performed by other components. In certain implementations the network adapter may be a specialized part of the central processing unit of the host system.

The data structures and components shown or referred to in FIGS. 1–7 are described as having specific types of information. In alternative embodiments, the data structures and components may be structured differently and have fewer, more or different fields or different functions than those shown or referred to in the figures. Furthermore, although certain embodiments have been described with respect to the TCP/IP protocol, other protocols may also be used.

Therefore, the foregoing description of the embodiments has been presented for the purposes of illustration and description. It is not intended to be exhaustive or to limit the invention to the precise form disclosed. Many modifications and variations are possible in light of the above teaching.

What is claimed is:

1. A method, comprising:
    allocating, by a protocol processor, metadata related to a packet in a host memory, wherein the host memory is comprised in a host that is coupled to a network adapter that includes the protocol processor, wherein the protocol processor is implemented in hardware or software, and wherein the network adapter is included in a chip set that includes a central processing unit of the host;
    copying, by the protocol processor, the metadata from the host memory to an adapter memory associated with the network adapter in anticipation of a requirement for protocol processing of the metadata by the protocol processor; and
    processing, by the protocol processor, the copied metadata.

2. The method of claim 1, wherein the copying further comprises:
    fetching the metadata from the host memory to the adapter memory, using at least one criterion to anticipate the requirement for protocol processing of the metadata by the protocol processor.

3. The method of claim 1, wherein the metadata is stored in a protocol control block of a transport protocol, wherein the protocol control block indicates a state of a session handled by the protocol processor, wherein the protocol processor reduces requirements for the adapter memory by utilizing the host memory to store the metadata, and wherein the metadata is prefetched in anticipation of the requirement for protocol processing of the metadata by the protocol processor.

4. The method of claim 1, further comprising:
    maintaining a data structure to indicate sessions capable of processing requests;
    receiving, by the protocol processor, a request for sending a packet; and
    copying the metadata from the host memory to the adapter memory, in response to determining based at least in part upon the data structure that the request can be associated with a session that is capable of processing the request.

5. The method of claim 1, further comprising:
    maintaining a data structure to indicate sessions capable of processing requests;
    receiving, by the protocol processor, a request for sending a packet;
    determining from the data structure whether the request can be associated with a session that is capable of processing the request; and
    queuing the request for later processing, in response to determining that the request cannot be associated with any session that is capable of processing the request.

6. A method, comprising:
    allocating, by a protocol processor, metadata related to a packet in a host memory, wherein the host memory is comprised in a host that is coupled to a network adapter that includes the protocol processor;
    copying, by the protocol processor, the metadata from the host memory to an adapter memory associated with the network adapter in anticipation of a requirement for protocol processing of the metadata by the protocol processor;
    maintaining a delayed acknowledgment timer, wherein the delayed acknowledgment timer is associated with a session;
    determining whether the delayed acknowledgment timer is likely to expire in a period of time, wherein the copying of the metadata from the host memory to the adapter memory is performed in response to determining that the delayed acknowledgment timer is likely to expire in the period of time; and
    processing, by the protocol processor, the copied metadata.

7. The method of claim 6, wherein the network adapter is an offload engine adapter, and wherein the host memory is larger in size than the adapter memory.

8. A network adapter, wherein the network adapter is capable of being coupled to a host having a host memory, the network adapter comprising:
    an adapter memory associated with the network adapter; and
    a protocol processor, wherein the protocol processor is capable of allocating metadata related to a packet in the host memory, copying the metadata from the host memory to the adapter memory in anticipation of a requirement for protocol processing of the metadata by the protocol processor, and processing the copied metadata, wherein the protocol processor is implemented in hardware or software, and wherein the network adapter is included in a chip set that includes a central processing unit of the host.

9. The network adapter of claim 8 wherein copying the metadata further comprises:
    fetching the metadata from the host memory to the adapter memory, using at least one criterion to anticipate the requirement for protocol processing of the metadata by the protocol processor.

10. The network adapter of claim 8, wherein the metadata is stored in a protocol control block of a transport protocol, wherein the protocol control block indicates a state of a session handled by the protocol processor, wherein the protocol processor reduces requirements for the adapter memory by utilizing the host memory to store the metadata, and wherein the metadata is prefetched in anticipation of the requirement for protocol processing of the metadata by the protocol processor.

11. The network adapter of claim 8, wherein the protocol processor is further capable of:
   maintaining a data structure to indicate sessions capable of processing requests;
   receiving a request for sending a packet; and
   copying the metadata from the host memory to the adapter memory, in response to determining based at least in part upon the data structure that the request can be associated with a session that is capable of processing the request.

12. The network adapter of claim 8, wherein the protocol processor is further capable of:
   maintaining a data structure to indicate sessions capable of processing requests;
   receiving a request for sending a packet; and
   determining from the data structure whether the request can be associated with a session that is capable of processing the request; and queuing the request for later processing in response to determining that the request cannot be associated with any session that is capable of processing the request.

13. A network adapter, wherein the network adapter is capable of being coupled to a host having a host memory, the network adapter comprising:
   an adapter memory associated with the network adapter; and
   a protocol processor, wherein the protocol processor is capable of allocating metadata related to a packet in the host memory, copying the metadata from the host memory to the adapter memory in anticipation of a requirement for protocol processing of the metadata by the protocol processor, and processing the copied metadata, wherein the protocol processor is further capable of:
      maintaining a delayed acknowledgment timer, wherein the delayed acknowledgment timer is associated with a session; and
      determining whether the delayed acknowledgment timer is likely to expire in a period of time, wherein the copying of the metadata from the host memory to the adapter memory is performed in response to determining that the delayed acknowledgment timer is likely to expire in the period of time.

14. The network adapter of claim 13, wherein the network adapter is an offload engine adapter, and wherein the host memory is larger in size than the adapter memory.

15. A system in communication with data storage, comprising:
   a host;
   a data storage controller to manage Input/Output (I/O) access to the data storage, wherein the data storage controller is coupled to the host;
   a network adapter coupled to the host;
   a host memory coupled to the host;
   an adapter memory associated with to the network adapter;
   a protocol processor included in the network adapter, wherein the protocol processor is capable of allocating metadata related to a packet in the host memory, copying the metadata from the host memory to the adapter memory in anticipation of a requirement for protocol processing of the metadata by the protocol processor, and processing the copied metadata; and
   a data structure to indicate sessions capable of processing requests, wherein the protocol processor is capable of receiving a request for sending a packet, wherein the protocol processor is capable of copying the metadata from the host memory to the adapter memory, in response to determining based at least in part upon the data structure that the request can be associated with a session that is capable of processing the request, wherein the protocol processor reduces requirements for the adapter memory by utilizing the host memory to store the metadata, and wherein the metadata is prefetched in anticipation of the requirement for protocol processing of the metadata by the protocol processor, wherein the protocol processor is further capable of maintaining a delayed acknowledgment timer, wherein the delayed acknowledgment timer is associated with a session and determining whether the delayed acknowledgment timer is likely to expire in a period of time, and wherein the copying of the metadata from the host memory to the adapter memory is performed in response to determining that the delayed acknowledgment timer is likely to expire in the period of time.

16. An article of manufacture, comprising a storage medium having stored therein instructions that when executed by a machine results in the following:
   allocating, by a protocol processor, metadata related to a packet in a host memory, wherein the host memory is comprised in a host that is coupled to a network adapter that includes the protocol processor, wherein the protocol processor is implemented in hardware or software, and wherein the network adapter is included in a chip set that includes a central processing unit of the host;
   copying, by the protocol processor, the metadata from the host memory to an adapter memory that is associated with the network adapter in anticipation of a requirement for protocol processing of the metadata by the protocol processor; and
   processing, by the protocol processor, the copied metadata.

17. The article of manufacture of claim 16, wherein the copying further comprises:
   fetching the metadata from the host memory to the adapter memory, using at least one criterion to anticipate the requirement for protocol processing of the metadata by the protocol processor.

18. The article of manufacture of claim 16, wherein the metadata is stored in a protocol control block of a transport protocol, wherein the protocol control block indicates a state of a session handled by the protocol processor, wherein the protocol processor reduces requirements for the adapter memory by utilizing the host memory to store the metadata, and wherein the metadata is prefetched in anticipation of the requirement for protocol processing of the metadata by the protocol processor.

19. The article of manufacture of claim 16, wherein the instructions when executed further results in the following:
   maintaining a data structure to indicate sessions capable of processing requests;
   receiving, by the protocol processor, a request for sending a packet; and
   copying the metadata from the host memory to the adapter memory, in response to determining based at least in part upon the data structure that the request can be associated with a session that is capable of processing the request.

20. The article of manufacture of claim 16, wherein the instructions when executed further result in the following:
  maintaining a data structure to indicate sessions capable of processing requests;
  receiving, by the protocol processor, a request for sending a packet;
  determining from the data structure whether the request can be associated with a session that is capable of processing the request; and
  queuing the request for later processing in response to determining that the request cannot be associated with any session that is capable of processing the request.

21. An article of manufacture, comprising a storage medium having stored therein instructions that when executed by a machine results in the following:
  allocating, by a protocol processor, metadata related to a packet in a host memory, wherein the host memory is comprised in a host that is coupled to a network adapter that includes the protocol processor;
  copying, by the protocol processor, the metadata from the host memory to an adapter memory that is associated with the network adapter in anticipation of a requirement for protocol processing of the metadata by the protocol processor;
  maintaining a delayed acknowledgment timer, wherein the delayed acknowledgment timer is associated with a session;
  determining whether the delayed acknowledgment timer is likely to expire in a period of time, wherein the copying of the metadata from the host memory to the adapter memory is performed in response to determining that the delayed acknowledgment timer is likely to expire in the period of time; and
  processing, by the protocol processor, the copied metadata.

22. The article of manufacture of claim 21, wherein the network adapter is an offload engine adapter, and wherein the host memory is larger in size than the adapter memory.

* * * * *